United States Patent
Rossum et al.

[11] Patent Number: 6,045,261
[45] Date of Patent: Apr. 4, 2000

[54] TEMPERATURE SENSOR ASSEMBLY

[75] Inventors: Neil Van Rossum, Sherwood Park; David Wannamaker; Michael Baldock, both of Edmonton, all of Canada

[73] Assignee: Alltemp Sensors Inc., Edmonton, Canada

[21] Appl. No.: 08/971,159

[22] Filed: Nov. 14, 1997

[51] Int. Cl.[7] .............................. G01K 1/00; G01K 1/08; H02G 15/064

[52] U.S. Cl. ...................... 374/208; 374/209; 174/73.1

[58] Field of Search .................................... 374/208, 209, 374/185; 174/73.1, 74 A, 74 R, 82, 93, 138 F

[56] References Cited

U.S. PATENT DOCUMENTS

| | | | |
|---|---|---|---|
| 2,953,921 | 9/1960 | Muncheryan | 374/185 |
| 3,754,201 | 8/1973 | Adams | 374/208 |
| 3,890,588 | 6/1975 | Kanaya et al. | 374/185 |
| 3,923,552 | 12/1975 | Parris | 374/185 |
| 4,841,274 | 6/1989 | Yanger, Jr. et al. | 374/208 |
| 5,695,285 | 12/1997 | Kuberka et al. | 374/208 |
| 5,720,556 | 2/1998 | Krellner | 374/185 |

*Primary Examiner*—Randy W. Gibson
*Attorney, Agent, or Firm*—Christensen, O'Connor, Johnson & Kindness PLLC

[57] ABSTRACT

A temperature sensor assembly has an explosion proof termination head body having a cap end, a conduit side and a process end, a conduit connection on the conduit side, a cap threaded onto the cap end; and a terminal block attached to the termination head body with a probe extending from the terminal block through a close tolerance opening in the process end. A terminal block is spring fastened to the termination head body to permit the probe limited axial movement within the close tolerance opening. The process end has a threaded opening in the termination head body, a fitting threaded into the threaded opening in the termination head body; and the close tolerance opening passes through the fitting.

4 Claims, 6 Drawing Sheets

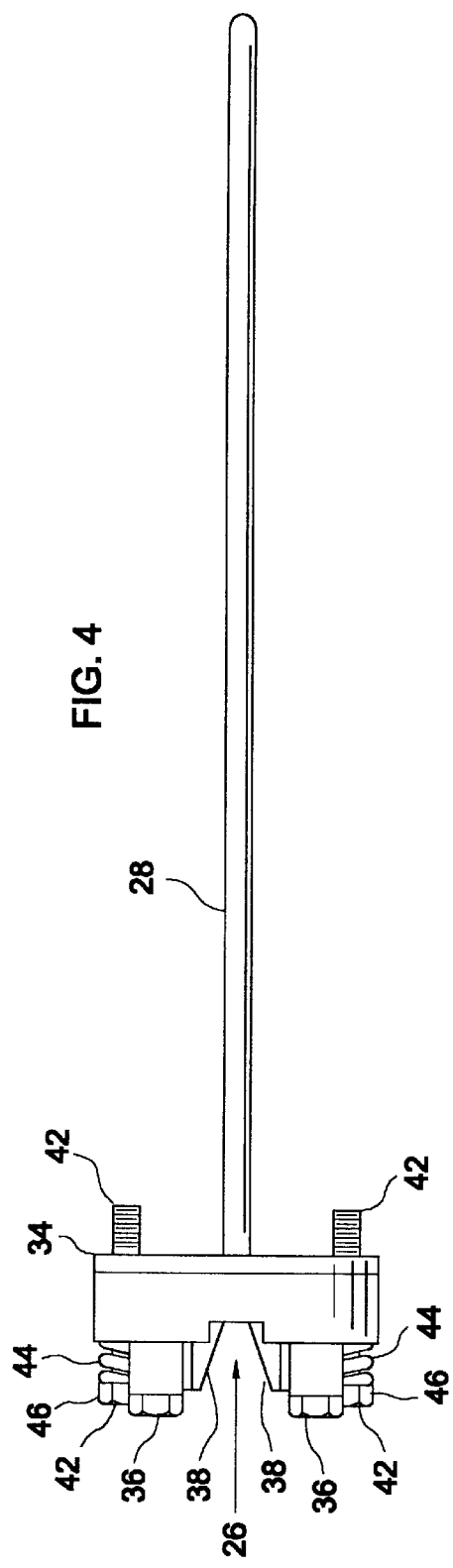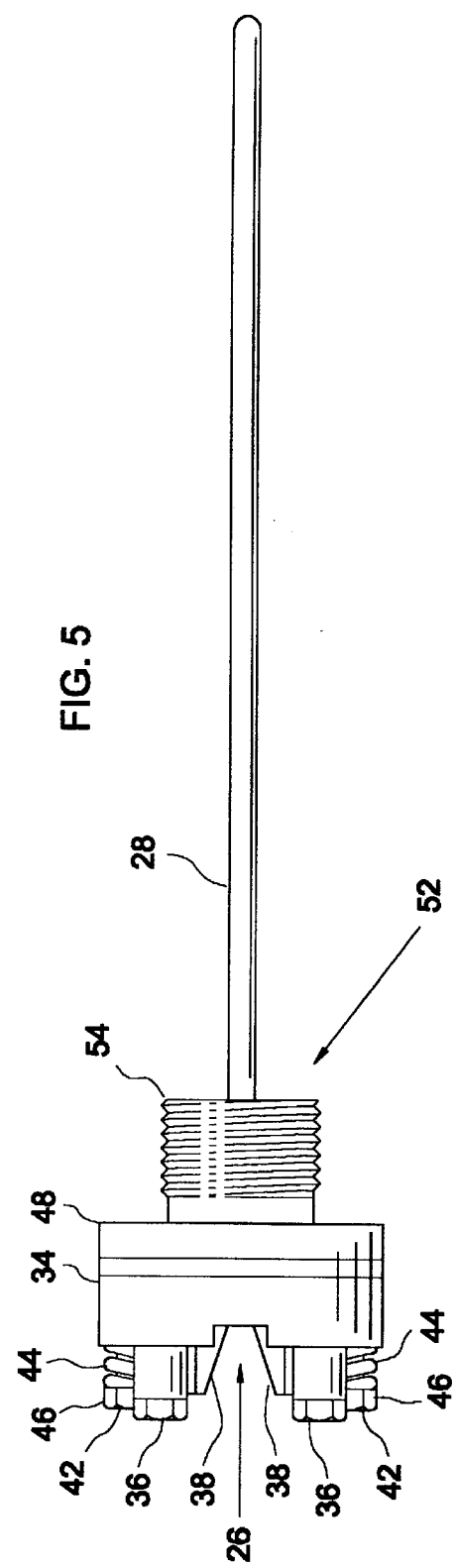

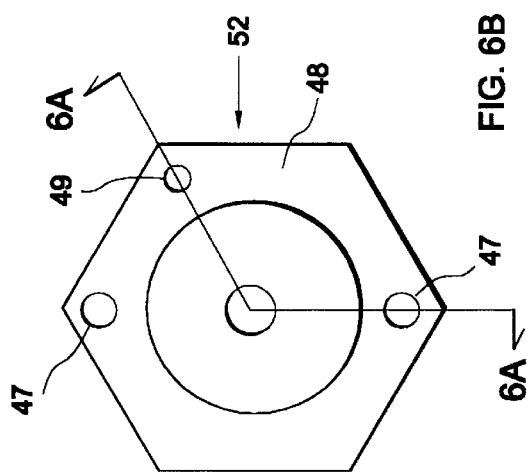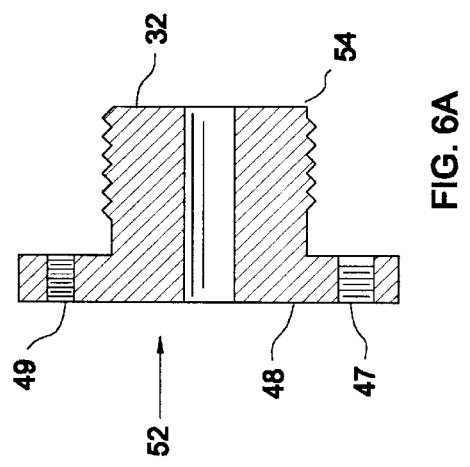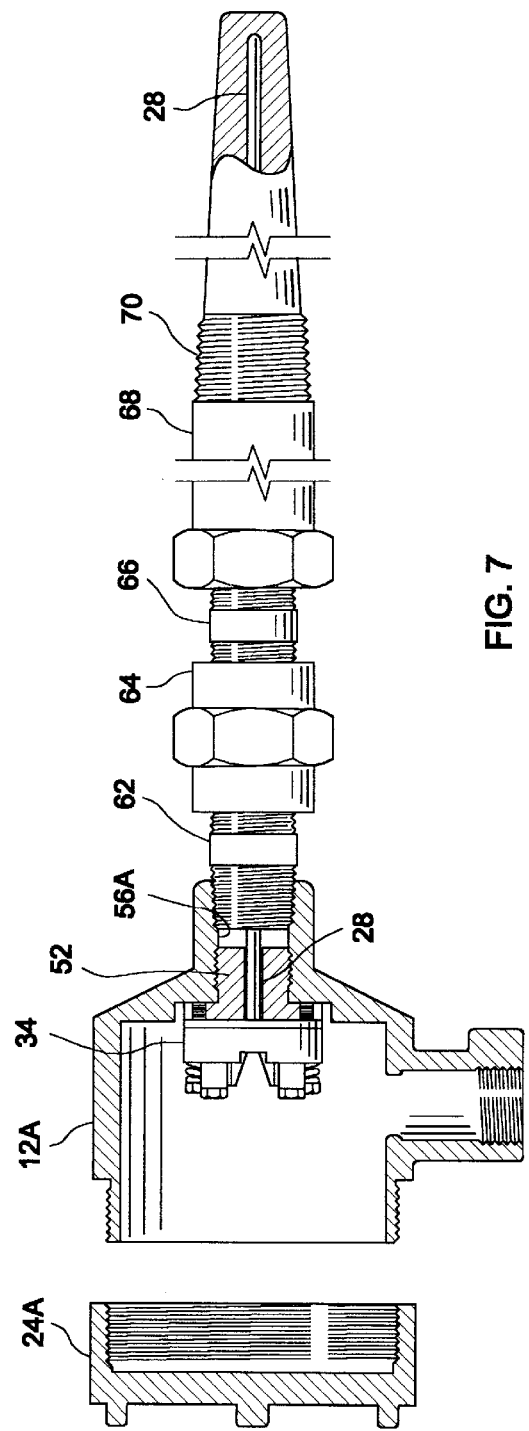

TEMPERATURE SENSOR ASSEMBLY

FIELD OF THE INVENTION

This invention relates to devices used for the installation of temperature sensors within hazardous environments.

BACKGROUND OF THE INVENTION

Regulatory requirements for temperature sensors used for monitoring industrial processes require that at the point of sale a temperature sensor must be explosion proof (in accordance with specified rules) as a stand alone item. That is, it must not require an additional part to be added to the device to render it in a form that meets regulatory requirements. For this reason, it has long been the practice to supply temperature sensor assemblies in conjunction with thermowells. The thermowells are protective enclosures that may be threaded into a coupling in process equipment, with an opening for insertion of a probe of a temperature sensor. The temperature sensor itself is then inserted into the thermowell, and then remains outside of the process equipment and can provide electrical signals indicative of the temperature in the process equipment. At the point of sale, the thermowell is therefore attached to the temperature sensor.

Customers in the industry have requested a certified stand alone temperature sensor and have specified the size requirements, and the necessity, in some instances, of a straight thread coupling to the thermowell.

In one prior art design of a stand alone temperature sensor made and sold in Canada by Alltemp Sensors, the assignee of the present invention, a thermocouple flame path assembly was provided that included a housing and an exterior nipple threaded into the housing, in which the nipple contained a probe welded or otherwise secured to a sleeve with precision diameter. Leads from the probe extended from the nipple into the housing. The sleeve had a close tolerance fit with the inside diameter of the nipple. While this device was adequate for its purpose, customers still required a certified stand alone device that had a termination head body that enclosed a terminal block.

SUMMARY OF THE INVENTION

There is therefore provided in accordance with an aspect of the invention, a temperature sensor assembly, comprising an explosion proof termination head body having a cap end, a conduit side and a process end, a conduit connection on the conduit side, a cap threaded onto the cap end; and a terminal block attached to the termination head body with a probe extending from the terminal block through a close tolerance opening in the process end.

In accordance with a further aspect of the invention, the terminal block is spring fastened to the termination head body to permit the probe limited axial movement within the close tolerance opening.

In accordance with a further aspect of the invention, the process end comprises a threaded opening in the termination head body, a fitting threaded into the threaded opening in the termination head body; and the close tolerance opening passing through the fitting.

In accordance with a further aspect of the invention, the fitting comprises a flange having greater diameter than the threaded opening; and means to fasten the terminal block to the flange.

In accordance with a further aspect of the invention, when the fitting is threaded into the threaded opening, the threaded opening includes a threaded portion that is free to receive a threaded end of a thermowell or other electrical fitting from outside of the termination head body.

These and other aspects of the invention are described in the detailed description of the invention and claimed in the claims that follow.

BRIEF DESCRIPTION OF THE DRAWINGS

There will now be described preferred embodiments of the invention, with reference to the drawings, by way of illustration only and not with the intention of limiting the scope of the invention, in which like numerals denote like elements and in which:

FIG. 4 is a side view of an RTD probe for use with the temperature sensor assembly shown in FIG. 1;

FIG. 5 is a side view of an RTD probe and fitting for use with the temperature sensor assembly shown in FIG. 1;

FIG. 6A is a side view of the fitting shown in FIG. 5;

FIG. 6B is an end view of the fitting shown in FIG. 6A;

FIG. 7 is a longitudinal section through a further embodiment of a temperature sensor assembly according to the invention.

DETAILED DESCRIPTION OF PREFERRED EMBODIMENTS

Figure 1:
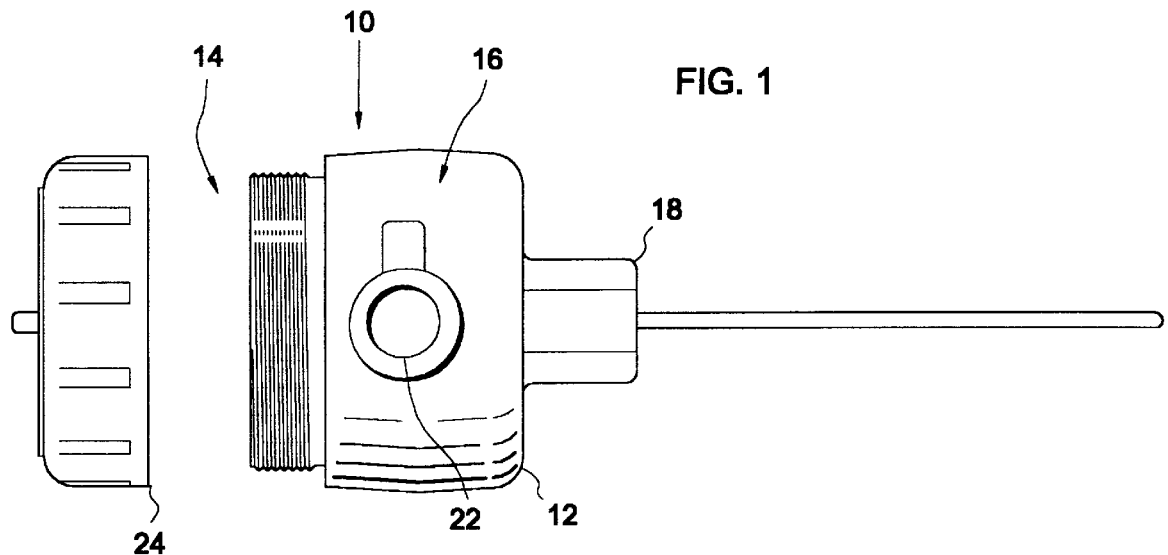
FIG. 1 is a side view of an embodiment of a termination head body with probe and cap according to the invention.

FIG. 1 shows an exemplary temperature sensor assembly 10 according to the invention. The temperature sensor assembly 10 is formed of an explosion proof termination head body 12 having a cap end 14, a conduit side 16 and a process end 18. A conduit connection 22 is provided on the conduit side for connection of leads into the temperature sensor assembly. A cap 24 is threaded onto the cap end 14. The cap 24 has shallow flutes 25 cut around its outer periphery to provide a hand grip for threading of the cap 24 onto the termination head body 12.

A terminal block 26 (FIGS. 4 and 5) is attached to the termination head body 12 with a probe 28 extending from the terminal block 26 through a close tolerance opening 32 (FIG. 6A) in the process end 18. The terminal block 26 is commonly available (for example, DIN 43762, available from Hsin Huey Enterprise, Taipei, Taiwan or Ari Industries, Addison, Ill., USA). The probe 28 may be a ¼ inch RTD probe, 250-4NI, made of 316SS, with an RTD element (Class A, 100 ohm Pt, DIN 43760, HT).

Figure 8:
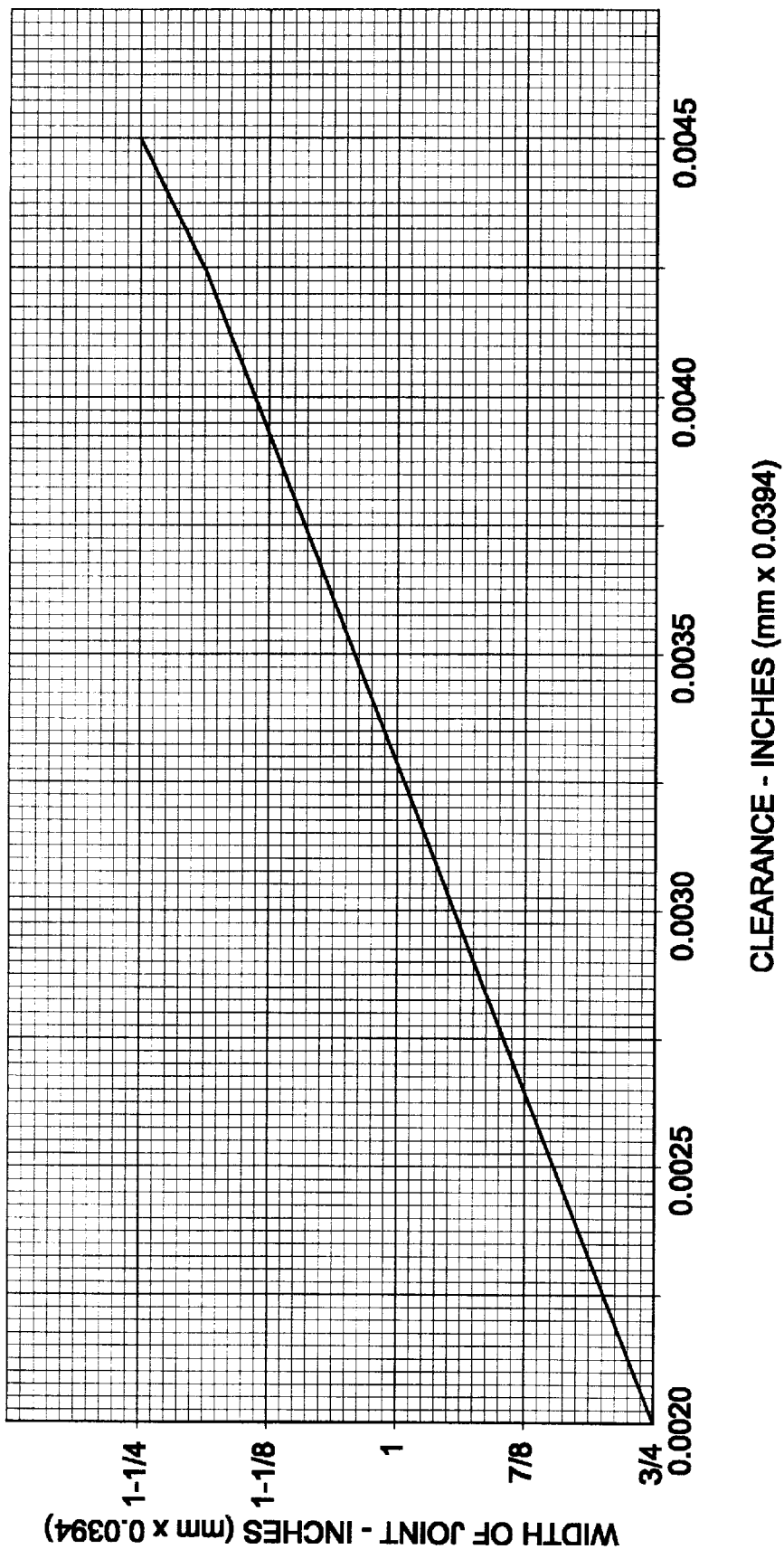
FIG. 8 is a graph showing a reproduction of FIG. 6.1 in UL1203, UL clearance requirements for a non-rotating shaft.

In the United States of America, the termination head body 12, cap 24, threads of the cap 24 and cap end 14, conduit connection 22, and close tolerance of the probe 28 within the opening 32 should all meet Underwriters Laboratory requirements for hazardous locations, Cl. 1, Div. 1, Grp. B, the content of which is hereby incorporated by reference. For example, the clearance between the probe 28 outer diameter and the inner diameter of the opening 32 should meet UL1203, Section 7.2.1, wherein the opening should have a length of path not less than 1 inch, and the diametrical clearance should be not more than 0.0045 inches for an opening having length of path L equal to or greater than 1.25 inches, and as shown in FIG. 8 when 1"≦L<1.25". An opening whose dimensions in relation to the probe diameter satisfy these regulatory requirements or such other equivalent applicable regulatory requirements is referred to herein as a close tolerance opening.

For example, in Canada, the termination head body 12, cap 24, threads of the cap 24 and cap end 14, conduit connection 22, and close tolerance of the probe 28 within the opening 32 should all meet Canadian Standards Association requirements for hazardous locations, Cl. 1, Div. 1, Grp. B, C, D; Cl. II, Grp. E, F, G; Cl. III encl. type 4 or 4X, the content of which is incorporated herein by reference. For example, in the case of enclosures having a size (free internal volume with the apparatus installed) (A) up to and including 100 cm$^3$, (B) between 100 cm$^3$ and 500 cm$^3$, (C) above 500 cm$^3$ and up to and including 2000 cm$^3$ and (D) above 2000 cm$^3$ and up to and including 6000 cm$^3$, the clearance between the probe 28 outer diameter and the inner diameter of the opening 32 should meet the CSA C22.2 No. 30 standard, wherein the minimum width of joint is (A) 6.0 mm (plain only) with a maximum gap of 0.05 mm, or 9.5 mm (plain or stepped) with a maximum gap of 0.1 mm), (B) 9.5 mm (plain or stepped) with a maximum gap of 0.04 mm (plain) or 0.1 mm (stepped), (C) 16 mm (plain) or 9.5 mm (stepped) with a maximum gap of 0.04 mm (plain) or 0.1 mm (stepped) and (D) 25 mm (plain) or 9.5 mm (stepped) with a maximum gap of 0.04 mm (plain) or 0.1 mm (stepped) respectively. The length of the flame path should be at least equal to the diameter of the probe but it need not exceed 25 mm. Preferably, the requirements for both countries should be met.

Figure 2A:
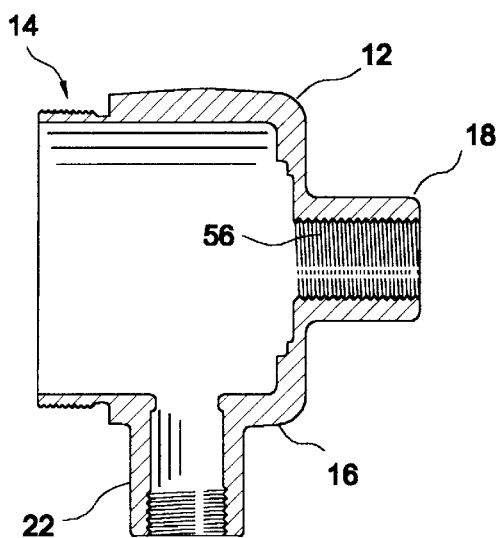
FIG. 2A is a cross-section through the termination head body of FIG. 1.
Figure 2B:
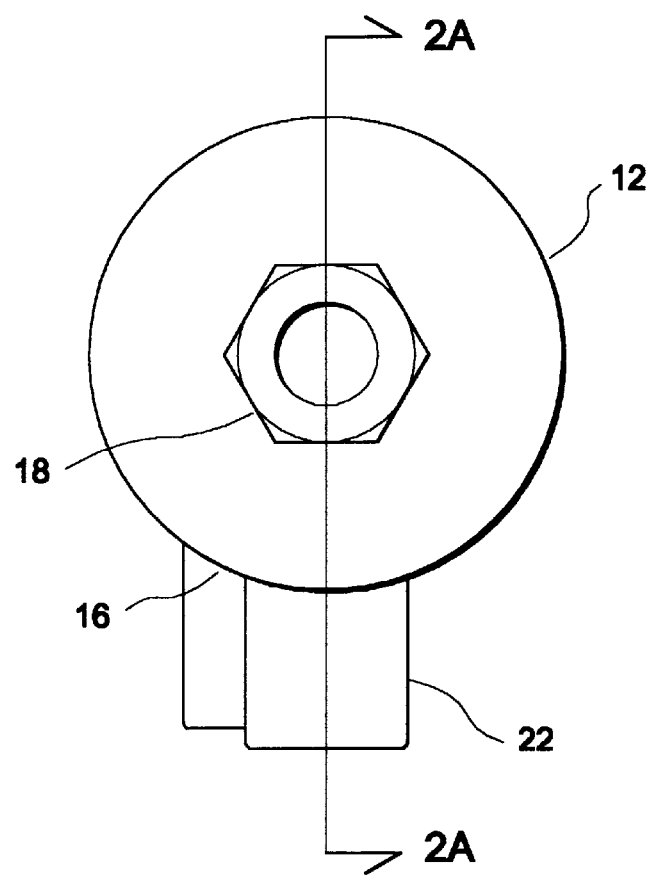
FIG. 2B is a process end view of the termination head body of FIG. 1.
Figure 2C:
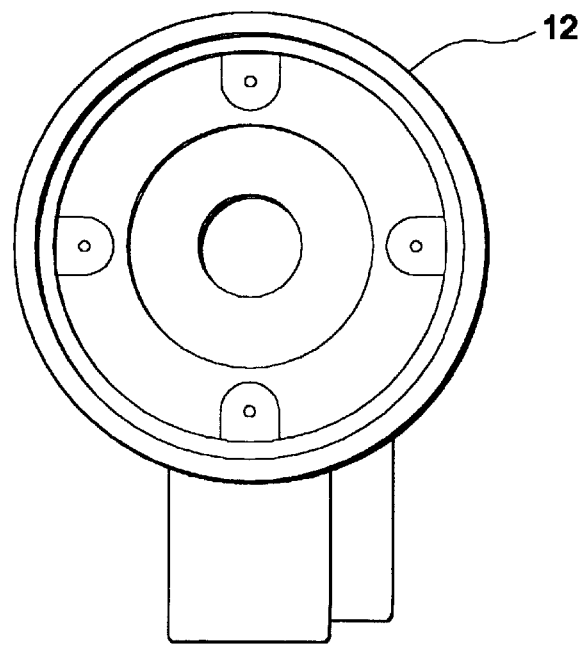
FIG. 2C is a cap end view of the termination head body of FIG. 1.
Figure 3A:
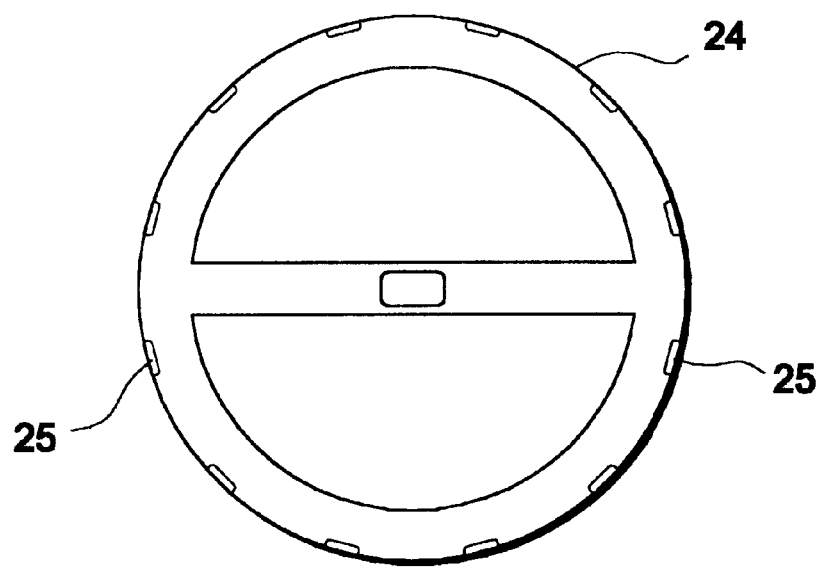
FIG. 3A is an end view of the cap shown in FIG. 1.
Figure 3B:
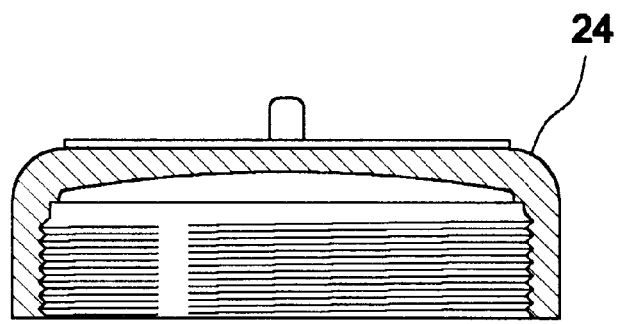
FIG. 3B is a cross-section through the cap of FIG. 3A.

As shown in FIGS. 4 and 5, the terminal block 26 is formed of a round plate 34 from which extend a pair of terminals 36. Temperature sensor probe 28 is secured to the plate 34 on the opposite side of the plate 34 from the terminals 36. Leads 38 from the probe 28 terminate at the terminals 36. Electrical leads (not shown) are attached to the terminals 36 and pass out of the termination head body 12 through the conduit connection 22. A pair of screws 42 pass through openings in the plate 34, and a coil spring 44 is disposed between the heads 46 of the screws 42 and the plate 34. The openings in the plate 34 for receiving the screws 42 should be large enough to allow the plate 34 to slide on the screws 42. The screws 42 are received by threaded openings 47 of flange 48 at one end of fitting 52 (FIGS. 6A and 6B) to form a means for securing the terminal block 26 to the termination head body 12. Other equivalent means may be used as would occur to a skilled person in the art and not depart from the invention. Fitting 52 includes a straight threaded portion 54 which is threaded into a straight threaded opening 56 (FIG. 2A) in the termination head body 12. The flange 48, which has greater diameter than the threaded opening 56, abuts against the interior surface of the termination head body 12 when the fitting 52 is fully threaded into the opening 56. The probe 28 passes through close tolerance opening 32 centrally located in fitting 52. The spring 44 biases the plate 34 against the flange 48, but force on the probe 28 permits the plate 34 to move towards the heads 46 and thus accommodate limited axial movement of the probe 28. In this manner, the terminal block 26 is spring fastened to the termination head body 12 to permit the probe 28 limited axial movement within the close tolerance opening 32.

The threaded opening 56 in the termination head body 12, the fitting 52 and the close tolerance opening 32 passing through the fitting 52 are all part of the process end 18 of the termination head body 12. The fitting 52 may be secured in the termination head body 12 by means of a capscrew, not shown, threaded into an opening 49 in the flange 48.

Preferably, when the fitting 52 is threaded into the threaded opening 56, the threaded opening 56 includes a threaded portion 58 that is free to receive a threaded end (not shown) of a conventional thermowell or other electrical fitting from outside of the termination head body 12. That is, the threaded portion 54 of the fitting 52 should not extend the full length of the threaded opening 56, but should for example leave a sufficient portion, as perhaps half of the length of the opening 56, for attachment of a conventional thermowell.

To assemble the device, the fitting 52 is first threaded into the opening 56. The probe 28 and terminal block 26 are then attached to the fitting 52 by screws 42 with the probe 28 received by opening 32. Leads from the conduit connection are then secured in conventional manner to the terminals 36. The cap 24 may then be threaded onto the termination head body 12. Once assembled, the entire temperature sensor assembly is ready for attachment to process equipment, without the necessity of on site inspection.

An assembled temperature sensor is shown in FIG. 7. In this embodiment, termination head body 12A and cap 24a are slightly differently constructed from termination head body 12 and cap 24 in terms of their shape as shown but is otherwise constructed in the same manner. Fitting 52, terminal block 34 and probe 28 are the same as shown in the other figures. In this embodiment, the threads in the outer portion of the threaded opening 56a are tapered to allow connection of nipple 62. Nipple 62 is connected through union 64 and nipple 66 to conventional thermowell 68. Depending on the application, union 64 and nipple 66 may be omitted. In use, the temperature sensor assembly shown in FIG. 7 may be attached to the process equipment to be monitored through threaded section 70 of thermowell 68 in conventional manner.

A person skilled in the art could make immaterial modifications to the invention described in this patent document without departing from the essence of the invention that is intended to be covered by the scope of the claims that follow.

The embodiments of the invention in which an exclusive property or privilege is claimed are defined as follows:

1. A temperature sensor assembly, comprising:
   an explosion proof termination head body having a cap end, a conduit side and a process end;
   a conduit connection on the conduit side;
   a cap threaded onto the cap end;
   a threaded opening in the process end of the termination head body;
   a fitting threaded into the threaded opening in the termination head body; and
   a terminal block attached to the fitting inside the termination head body with a probe extending from the terminal block through a close tolerance opening in the fitting to form a flame path in the termination head body.

2. The temperature sensor assembly of claim 1 in which the terminal block is spring fastened to the termination head body to permit the probe limited axial movement within the close tolerance opening.

3. The temperature sensor assembly of claim 2 in which the fitting comprises:

a flange having greater diameter than the threaded opening; and means to fasten the terminal block to the flange.

4. The temperature sensor assembly of claim 2 in which, when the fitting is threaded into the threaded opening, the threaded opening includes a threaded portion that is free to receive a threaded end of an electrical fitting from outside of the termination head body.

* * * * *

UNITED STATES PATENT AND TRADEMARK OFFICE
CERTIFICATE OF CORRECTION

PATENT NO. : 6,045,261  
DATED : April 4, 2000  
INVENTOR(S) : N. Van Rossum et al.

Page 1 of 1

It is certified that error appears in the above-identified patent and that said Letters Patent is hereby corrected as shown below:

<u>Title page,</u>
Item [19] Inventor line, "Rossum et al." should read -- Van Rossum et al. --
Item [56] References Cited (Other Publs.), after the final U.S. references, insert the following:

-- OTHER PUBLICATIONS

Excerpt from Canadian Standards Association Construction requirements for Explosion Proof Enclosures, published in Canada, this version November 1988.

Excerpt from UL 1203 published in the United States July 27, 1994.

Series 1000 Thermocouple Flame Path Assemblies product description published at least as early as May 1996.

Three sheets showing electrical enclosures sold in the United States since at least as early as July 1993, February 1991 and February 1991, repectively.

Tube skin thermocouples (V-Pad) product description (2 pages) published well before November 1997.

Aeropad Thermocouples product description (3 pages) from ARi Industries Inc., Bulletin 3.0, July 1988. --

Signed and Sealed this

Eleventh Day of September, 2001

*Attest:*

Nicholas P. Godici

NICHOLAS P. GODICI  
*Acting Director of the United States Patent and Trademark Office*

*Attesting Officer*